United States Patent Office 2,806,010
Patented Sept. 10, 1957

2,806,010

PRODUCTION AND USE OF SOLUTIONS OF ACRYLONITRILE POLYMERS

Edward William Wheatley, Arthur Hodge, and James Wotherspoon Fisher, Spondon, near Derby, England, assignors to British Celanese Limited, a corporation of Great Britain No Drawing. Application June 26, 1952, Serial No. 295,827

Claims priority, application Great Britain July 2, 1951

12 Claims. (Cl. 260—29.6)

This invention relates to solutions of polyacrylonitrile and copolymers containing acrylonitrile as the preponderating constituent, and to their use in making shaped articles such as fibres and films.

A class of polymer of increasing importance consists of polyacrylonitrile and copolymers of acrylonitrile with other unsaturated compounds, especially vinyl compounds. Examples of such other unsaturated compounds are: substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; vinyl compounds containing basic nitrogen, e. g. 2-vinyl-pyridine, 2-methyl-5-vinyl-pyridine and $\beta$-morpholino-ethyl vinyl ether; and vinylidene chloride. Polyacrylonitrile itself and such copolymers with other unsaturated compounds as contain a preponderating proportion of acrylonitrile are in the present specification referred to as acrylonitrile polymers. It is well known that many acrylonitrile polymers, especially such as have fibre-forming properties, are insoluble in the organic liquids commonly employed as solvents, and that this constitutes a considerable difficulty in the way of utilising these polymers.

While a number of liquids are known which are capable of dissolving acrylonitrile polymers at high temperatures, they are quite ineffective at room temperatures. Moreover, while aqueous mineral oxy-acids, for example sulphuric acid and nitric acid of concentration about 55% and higher, will dissolve acrylonitrile polymers in the cold, such solvents are not only very corrosive, but also cause an alteration in the chemical structure and in the porperties of the polymer by hydrolysis of a proportion of the nitrile groups. This hydrolysis takes place during the whole of the period which must, under factory conditions, elapse between the beginning of the formation of the solution and its use in the production of fibres or for some other purpose, and not only results in a change in the properties of the polymer, but also means that unless the period during which the polymer is in contact with the acid is always the same, the composition and properties of fibres and other articles made from the polymer will not be uniform. No solvent has heretofore been discovered which will dissolve polyacrylonitrile at room temperatures without causing a substantial degree of chemical change in the polymer.

It is an object of this invention to provide solvents for acrylonitrile polymers that can be used at room temperatures, but which at such temperatures cause at most an unimportant degree of hydrolysis over periods of several hours, and which are less corrosive than the aqueous acids referred to above.

We have now discovered that mixtures of mineral oxy-acids, especially nitric acid, with both water and an organic liquid which it itself a solvent or swelling agent for polyacrylonitrile at high temperatures are capable of dissolving acrylonitrile polymers at room temperatures, even when the concentration of mineral acid in the mixture is so low that the polymer undergoes little chemical change when kept in the solution for 24 hours or more. (The term "concentration of acid in the mixture" is employed in this specification to denote the ratio between the weight of acid, reckoned as anhydrous, and the total weight of the solvent mixture.) We have obtained particularly good results with mixtures of nitric acid, water and nitromethane in which the amount of nitric acid is 1–9 times the weight of the water, and the invention will, for the sake of brevity, be described in more detail by reference to such mixtures. It will however be understood that the nitric acid may be replaced by another mineral oxy-acid, e. g. sulphuric acid, a sulphonic acid or phosphoric acid, and that instead of nitromethane there may if desired be employed another organic solvent or swelling agent for polyacrylonitrile which is not attacked by the mineral acid in the solvent mixture. Examples of organic solvents that may be employed in association with aqueous nitric acid of concentration about 50–65% are dimethyl-formamide and nitroethanol.

The solvent mixtures of nitric acid, water and nitromethane which we prefer to use contain about 1–3 times as much nitric acid as water (by weight), and sufficient nitromethane to bring the concentration of nitric acid in the solution below 45% and preferably to about 8–45%, solutions in which the concentration of nitric acid is about 10–25% being particularly useful. From one viewpoint it is remarkable that, while aqueous nitromethane has to be heated to a temperature in the neighbourhood of 90°–100° C. before it will dissolve polyacrylonitrile, the presence of as little as 8 or 10% of nitric acid enables the mixture to dissolve polyacrylonitrile rapidly at temperatures of 15°–25° C. or even lower. Equally, from another view-point, it is remarkable that the presence of a substance which itself has solvent power for polyacrylonitrile only at temperatures of about 90°–100° C. and higher can reduce the minimum concentration which nitric acid must have if it is to be a solvent at room temperature from 50%–55% to about 8%.

It is a great advantage of the solvents of this invention over the organic solvents for acrylonitrile polymers previously known, that not only will they dissolve the polymers rapidly at room temperatures such as 15°–25° C. and even lower, but also the solutions obtained can be kept at these temperatures without gelling for quite long periods, e. g. for 18–24 hours and more. If desired however the polymers may be dissolved in the new solvents at higher temperatures, e. g. temperatures up to about 35° C., especially if it is desired to effect solution very quickly or to obtain highly concentrated solutions, e. g. polyacrylonitrile solutions of concentration 20–25% or higher, and a moderate degree of hydrolysis is required or can be tolerated.

When the solutions are to be used for the production of one- and two-dimensional shaped articles, such as fibres and films, by extrusion or casting methods, it is preferable that the viscosity of the polyacrylonitrile or other acrylonitrile polymer (measured in 1% solution in dimethylformamide at 20° C.) should be between about 2.5 and 4 centistokes, and especially between 3 and 3.5 centistokes; the concentration of the solution is preferably between about 3% and 20% and especially between 5% and 16%.

The shaped articles may be made by extruding or casting the solution into a liquid coagulating medium which is preferably wholly or partly organic in nature. For example solutions of polyacrylonitrile in mixtures of nitric acid, water and nitromethane may be coagulated by means of a bath of a high boiling carboxylic acid ester, especially a dialkyl phthalate, as described in U. S. application Ser. No. 257,198 of J. Downing and J. G. N. Drewitt, now Patent No. 2,724,634, or by means of a bath comprising nitromethane, or another relatively low boiling organic liquid which is miscible with nitromethane and preferably has some solvent or swelling action on polyacrylonitrile. Advantageously the bath may initially consist of anhydrous or aqueous nitromethane.

The spinning solution and the coagulating bath may be at or near room temperature, e. g. between about 15° and 25° C., or either or both may, if desired, be at a slightly higher temperature, e. g. up to about 35° C., or may be cooled below room temperature.

Moreover while it is generally preferable not to heat the spinning solution much above 35° C., so as to avoid hydrolysing the polymer, the coagulating bath may be at a considerably higher temperature, e. g. at a temperature between about 35° and 60° or 80° C., especially when the concentration of nitric acid in the spinning solution is below about 25%. When the coagulating liquid is a compound or mixture which at high temperatures is capable of dissolving the acrylonitrile polymer, it must of course be used at temperatures considerably below that at which it acquires this solvent power.

Fibres made in accordance with the invention are preferably orientated by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example the fibres, after leaving the coagulating bath, may be wound up and washed (e. g. in the form of multi-filament yarns) and then stretched while heated; for example they may be stretched in hot air, wet steam, or water at a temperature above 80° C. as described in U. S. specification Ser. No. 127,256 of E. B. Johnson and J. Downing, now abandoned, or while they are passed in contact with a hot metal surface, e. g. the surface of a plate or roller kept at about 150°–220° C. To obtain a yarn of the highest tenacity it is advantageous to stretch the fibres as soon as possible after coagulation is complete; for example they may be stretched continuously with their formation, if desired after an intermediate wash with water. If the separate filaments in a multi-filament yarn show any tendency to stick together or coalesce during the stretching operation, this can generally be prevented by passing the yarn through an aqueous oil emulsion, or otherwise applying an aqueous oil emulsion to the yarn, before it is heated and stretched, or by carrying out the stretching operation in an aqueous oil emulsion at an elevated temperature, especially at a temperature above 80° C., as described in U. S. specification Ser. No. 127,256 of E. B. Johnson and J. Downing. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

While the solutions of the invention are of particular value in the production of fibres and films and other one- and two-dimensional articles by extrusion or casting methods, they may also be employed for other purposes, e. g. for the production of coatings of acrylonitrile polymers.

The invention is illustrated by the following examples.

Example I 10 parts by weight of a polyacrylonitrile of viscosity (in 1% solution in dimethyl-formamide at 20° C.) 3.3 centistokes was added gradually with stirring at 20° C. to 90 parts by weight of a solvent mixture obtained by adding 70% aqueous nitric acid to 4 times its volume of nitromethane, the concentration of nitric acid in the solvent mixture thus being 16.5% by weight. A clear mobile solution was obtained, which could be extruded into nitromethane containing 5% by weight of water, or into dibutyl phthalate, either at 20° C. or at 60° C., to form fibres which after being orientated and relaxed possessed good textile properties.

Example II

The polyacrylonitrile employed in Example I was analysed and found to have a nitrogen content of 25.2%. (Polyacrylonitriles prepared commercially usually have a nitrogen content a little below the theoretical value.) Solutions of this polyacrylonitrile in 6 times its weight of (a) A mixture of 3 volumes of 55% aqueous nitric acid and 7 volumes of nitromethane,
(b) A mixture of 7 volumes of 55% aqueous nitric acid and 3 volumes of nitromethane, and
(c) 60% aqueous nitric acid free from organic liquids, were made and allowed to stand for various periods. The nitrogen contents of the polymer after the solutions had stood at 20° C. for various periods of time are shown in the following table.

| Solvent | Standing Period | | |
|---|---|---|---|
| | 24 hours | 48 hours | 72 hours |
| | Percent | Percent | Percent |
| (a) | 24.8 | 24.6 | 24.6 |
| (b) | 25.2 | 24.6 | 24.4 |
| (c) | 22.9 | 19.7 | 18.5 |

While the invention is of particular value in connection with fibre-forming polyacrylonitrile, and has been described with particular reference to this polymer, it is also applicable to copolymers, especially fibre-forming copolymers which are insoluble in acetone, containing a preponderating amount of acrylonitrile. Examples of such copolymers are copolymers containing 85% or more of acrylonitrile and 15% or less of vinyl chloride, 60% or more of acrylonitrile and 40% or less of methacrylonitrile, or 90% or more of acrylonitrile and 10% or less of 2-methyl-5-vinyl-pyridine or β-morpholino ethyl vinyl ether.

Having described our invention, what we desire to secure by Letters Patent is:

1. Compositions comprising a polymer selected from the group which consists of polyacrylonitrile and acetone-insoluble copolymers of acrylontrile with another monovinyl compound in which the acrylonitrile preponderates, dissolved in a mixture of a mineral oxyacid of an element selected from the group which consists of nitrogen, sulphur and phosphorus with water and nitromethane, in which the amount of mineral acid is 1 to 3 times the weight of the water, and the concentration of the mineral acid in the mixture is 8 to 45% by weight.

2. Compositions comprising a fibre-forming polymer selected from the group which consists of polyacrylonitrile and acetone-insoluble copolymers of acrylonitrile with another monovinyl compound in which the acrylonitrile preponderates, dissolved in a mixture of a mineral oxyacid of an element selected from the group which consists of nitrogen, sulphur and phosphorus with water and nitromethane, in which the amount of mineral acid is 1 to 3 times the weight of the water, and the concentration of the mineral acid in the mixture is 8 to 45% by weight.

3. Compositions comprising a fibre-forming polymer selected from the group which consists of polyacrylonitrile and acetone-insoluble copolymers of acrylonitrile with another monovinyl compound in which the acrylonitrile preponderates, dissolved in a mixture of nitric acid, water and nitromethane, in which the amount of nitric acid is 1 to 3 times the weight of the water, and the concentration of the nitric acid in the mixture is 10 to 25% by weight.

4. Process for the production of solutions of polymers selected from the group which consist of polyacrylonitrile and acetone-insoluble copolymers of acrylonitrile with another monovinyl compound in which the acrylonitrile preponderates, which comprises mixing the polymer with a solvent mixture of a mineral oxyacid of an element selected from the group which consists of nitrogen, sulphur and phosphorus with water and nitromethane, the amount of the mineral acid in the mixture being 1 to 3 times the weight of the water, the concentration of the mineral acid in the mixture being 8 to 45% by weight, and the temperature of the mixture being kept below 35° C.

5. Process for the production of solutions of fibre-forming polymers selected from the group which consists of polyacrylonitrile and acetone-insoluble copolymers of acrylonitrile with another monovinyl compound in which the acrylonitrile preponderates, which comprises mixing the polymer with a solvent mixture of a mineral oxyacid of an element selected from the group which consists of nitrogen, sulphur and phosphorus with water and nitromethane, the amount of the mineral acid in the mixture being 1 to 3 times the weight of the water, the concentration of the mineral acid in the mixture being 8 to 45% by weight, and the temperature of the mixture being kept below 35°C.

6. Process for the production of solutions of fibre-forming polymers selected from the group which consists of polyacrylonitrile and acetone-insoluble copolymers of acrylonitrile with another monovinyl compound in which the acrylonitrile preponderates, which comprises mixing the polymer with a solvent mixture of nitric acid, water and nitromethane, the amount of nitric acid in the solvent mixture being 1 to 3 times the weight of water, the concentration of the nitric acid in the solvent mixture being 10 to 25% by weight, and the temperature of the solvent mixture being kept below 35° C.

7. Process for the production of solutions of fibre-forming polymers selected from the group which consists of polyacrylonitrile and acetone-insoluble copolymers of acrylonitrile with another monovinyl compound in which the acrylonitrile preponderates, which comprises mixing the polymer with a solvent mixture of nitric acid, water and nitromethane, the amount of nitric acid in the solvent mixture being 1 to 3 times the weight of water, the concentration of the nitric acid in the solvent mixture being 10 to 25% by weight, and the temperature of the solvent mixture being kept between 10° and 25° C.

8. As a new composition of matter, the solution of a polymer of acrylonitrile, containing in the polymer molecule at least 85% by weight of acrylonitrile in a solvent which consists of a mixture of aqueous nitric acid containing 55-75% $HNO_3$ and nitromethane, the ratio of aqueous nitric acid and nitromethane in the mixture being 15-90% aqueous acid and 85-10% nitromethane.

9. The composition of matter of claim 8, in which the polymer of acrylonitrile is polyacrylonitrile.

10. As a new composition of matter, a highly viscous liquid particularly adapted to be spun, consisting of a solution of polyacrylonitrile, in a solvent which consists of a mixture of nitromethane and aqueous nitric acid in a proportion such that the ratio of aqueous nitric acid and nitromethane is 15-90% aqueous acid and 85-10% nitromethane.

11. As a new composition of matter, a highly viscous liquid particularly adapted to be spun, consisting of a solution of polyacrylonitrile possessing a mean molecular weight ranging between 70,000 and 133,000, in a solvent which consists of a mixture of nitromethane and aqueous nitric acid in a proportion such that the ratio of aqueous nitric acid and nitromethane is 15-90% aqueous acid and 85-10% nitromethane.

12. As a new composition of matter, the solution of a polymer selected from the group which consists of polyacrylonitrile and acetone-insoluble copolymers of acrylonitrile with another monovinyl compound in which the acrylonitrile preponderates, in a solvent which consists of a mixture of aqueous nitric acid containing 50-75% $HNO_3$ and nitromethane, the ratio of aqueous nitric acid and nitromethane in the mixture being 10⅔-90% aqueous acid and 89⅓-10% nitromethane.

References Cited in the file of this patent

UNITED STATES PATENTS

| | | |
|---|---|---|
| 2,579,451 | Polson | Dec. 18, 1951 |
| 2,671,768 | Halbig | Mar. 9, 1954 |

FOREIGN PATENTS

| | | |
|---|---|---|
| 665,004 | Great Britain | Jan. 16, 1952 |